July 9, 1968             E. W. OLSON             3,392,285
PULSE GENERATOR FOR FENCE CONTROLLER
Filed Aug. 16, 1965
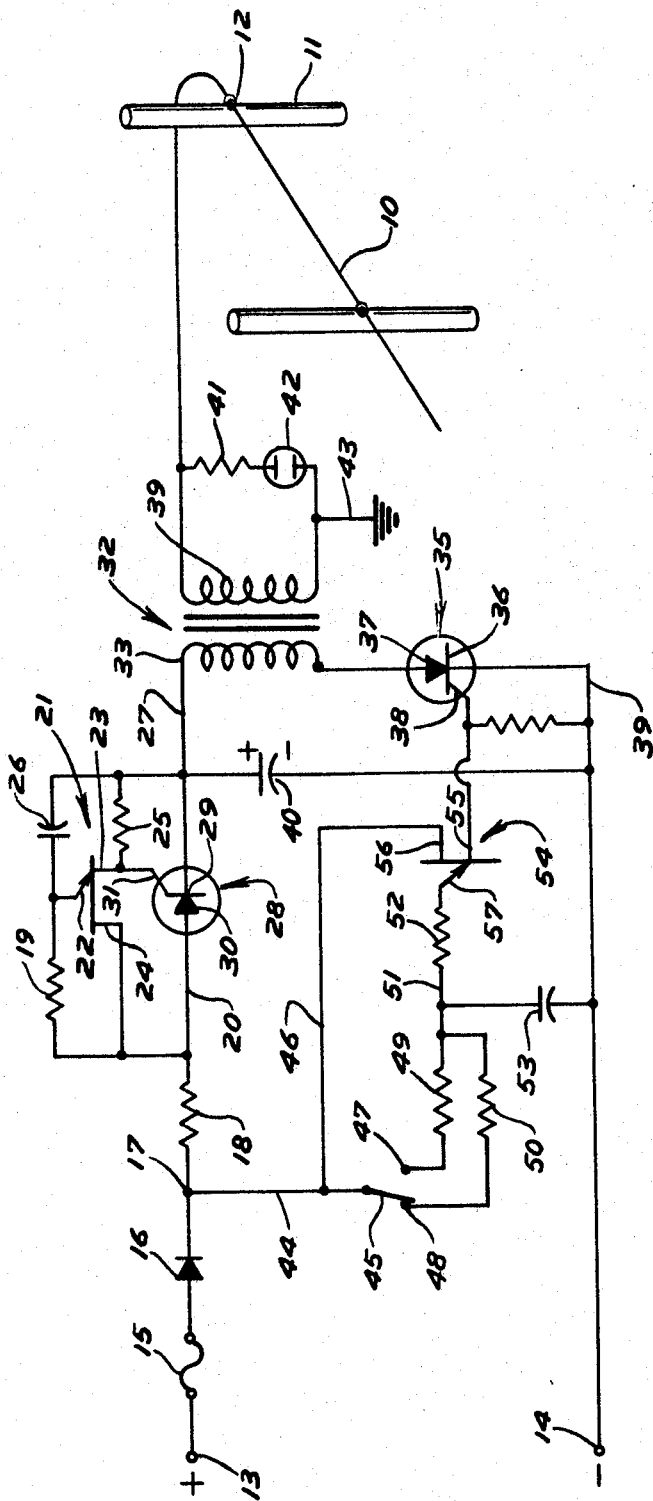
INVENTOR.
ELLIS W. OLSON
BY
Carlsen, Carlsen & Sturm
ATTORNEYS

United States Patent Office 3,392,285
Patented July 9, 1968

3,392,285
PULSE GENERATOR FOR FENCE CONTROLLER
Ellis W. Olson, Hopkins, Minn., assignor, by mesne assignments, to Introl Corporation, a corporation of Minnesota
Filed Aug. 16, 1965, Ser. No. 479,853
10 Claims. (Cl. 307—108)

ABSTRACT OF THE DISCLOSURE

An electric fence controller for supplying periodic pulses of predetermined magnitude to an electric fence which utilizes an energy storage means in the form of a capacitor that is automatically charged from a source of direct current through a current controlling means that is rendered conductive from a potential responsive triggering means which includes time delay means, to charge the capacitor from the source of direct current whenever the potential across the capacitor falls below a predetermined minimum value. A second current controlling device is connected in series with a load means, e.g., a transformer connected to an electric fence, in parallel with the capacitor and is adapted to be rendered conductive by means of a triggering device which includes time delay means operative from the source of direct current energy in such a manner as to render the second current controlling device conductive only after the energy storage means has accumulated a charge of energy of predetermined value. The triggering means utilized to control the conduction of the first and second current controlling means are operable independently of one another and the current supplied to the load terminals from the energy storage means is controlled only by the second current controlling means.

---

In the prior art with which my invention is concerned, one or more insulated conductors are disposed around an area to be enclosed and in which, for instance, it is desired to confine livestock or the like. A source of electrical energy is connected intermediate the insulated conductors and the ground and is adapted to periodically energize the insulated conductors with pulses of electrical energy. It is desired to provide the fence conductors with pulses of electrical energy of suitable magnitude, duration and frequency so that, should livestock contact the conductors during the time they are energized, the shock received by the livestock will be sufficient to serve as a deterrent, or reminder, that is of such a nature as to cause the livestock to be repelled by the fence. One of the advantages in using an electric fence is that the strength of the fence and the number of fence wires may be substantially reduced below that normally required to resist the efforts of livestock confined within an enclosure to escape.

It may further be noted that there are at least two classes of fence controllers in current use. In one class, the presence of a readily available source of alternating current energy allows the use of various timing mechanisms for controlling the frequency of pulses applied to an electric fence. Further, the presence of a commercially available alternating current source of energy does not impose any substantial limitation on the amount of energy that may be consumed by the fence controller in carrying out its intended operation.

On the other hand, and in the area with which my invention is primarily concerned, there are numerous applications of electric fences in which there is no readily available source of alternating current energy and it is necessary, therefore, to utilize batteries and the like as a source of electric energy and therefore the fence chargers, or controllers, must be operative from a source of direct current energy, must be accurate in providing the desired frequency of operation and should also be of a relatively high efficiency so as to conserve the direct current energy available whereby the longest possible battery life may be obtained.

In prior art apparatus operative from batteries and the like, the efficiency has been observed to remain at a substantially low level so that batteries have a relatively short life when in actual service. It is further noted that prior art apparatus designed for this class of operation has generally utilized electromechanical timing devices which do not maintain the desired frequency of operation with any substantial accuracy and further are relatively short lived because of the mechanical components used therein. It has further been observed that the energy content of pulses of energy provided by prior art apparatus has not been consistent and may substantially deviate from a desired level of operation in that the energy content may be much greater or much less than that required and desired for operation of an electric fence.

As will be described in greater detail below, my improved electric fence controller, or charger, provides greater efficiency and reliability of operation for devices of the class designed to be operative from a source of direct current electrical energy. Briefly, my invention is comprised of a pair of current controlling devices connected in series with a transformer primary winding across a source of direct current electrical energy. One of the current controlling devices is adapted to be controlled from a potential responsive means connected in parallel therewith and is operative to maintain the first current controlling device conductive when a potential appears thereacross to charge a capacitor connected in parallel with the other current controlling device and the transformer primary winding. The second current controlling device is connected to be controlled by another potential responsive means which includes suitable timing means whereby the second current controlling device is rendered conductive only after the capacitor connected in parallel therewith has been fully charged and the first current controlling device has been rendered nonconductive. It may thus be seen that a first current controlling device is operative to charge a large capacitor from a source of direct current energy and when the capacitor has become fully charged, the current controlling device is rendered nonconductive. After the capacitor has been fully charged, a second current controlling device is thereafter rendered conductive to discharge the capacitor through the primary winding of a transformer. Upon discharge of the capacitor, the second current controlling device is rendered nonconductive and the cycle becomes repetitive.

It is therefore an object of my invention to provide an improved fence controlling device that is operative from a source of direct current energy.

A further object of my invention is to provide an improved direct current fence controller having increased reliability of operation.

A still further object of my invention is to provide a direct current fence controller having improved efficiency characteristics.

A still further object of my invention is to provide an improved direct current fence controller, which does not utilize mechanical components, and which provides improved reliability and efficiency of operation.

Another object of my invention is to provide an improved direct current fence controller in which current controlling devices are operative to successively and repetitively charge and discharge an energy storage means through the primary winding of a transformer.

These and other objects of my invention will become apparent from a consideration of the appended specification, claims and drawing in which:

The sole figure is a schematic diagram of a direct current fence controller embodying the principles of my invention.

Referring now to the drawing, there is shown a pair of input terminals 13 and 14 adapted for connection to a suitable source of direct current energy (not shown) which may be, for example, an electric storage battery. At the right end of the drawing, a representation of a portion of an electric fence is shown having a conductor 10 suitably disposed on insulators 12 that are mounted on posts 11 that are disposed around an area to be disclosed. Conductor 10 is shown connected to secondary winding 34 on transformer 32. Secondary winding 34 is shown having one end connected to a ground terminal 43 and having a potential responsive gaseous discharge device 42 and current limiting resistor 41 connected in parallel therewith.

The top end of primary winding 33 on transformer 32 is connected to input terminal 13 through conductor 27, current controlling device 28, shown in the form of a silicon controlled rectifier having an anode electrode 30, a cathode electrode 29 and a gate electrode 31, conductor 20, current limiting resistor 18, conductor 17, asymmetrical current conducting device 16 and suitable fuse means 15. The lower end of transformer primary winding 33 is shown connected to input terminal 14 through current controlling device 35, shown in the form of a silicon controlled rectifier having an anode electrode 37, a cathode electride 36 and a gate electrode 38 and conductor 39.

A potential responsive current controlling device 21, shown in the form of a unijunction transistor having an emitter electrode 22 and base electrodes 23 and 24 is shown connected in parallel with current controlling device 28. Emitter electrode 22 is connected to base electrode 24 through resistor 19 and base electrode 24 is connected to conductor 20. Emitter electrode 22 is also connected to base electrode 23 through capacitor 26 and resistor 25. Base electrode 23 is connected to conductor 27 through conductor 25. An energy storage capacitor 40 is shown connected intermediate conductors 27 and 39 and thereby in parallel with transformer primary winding 33 and current controlling device 35.

A second potential responsive current controlling device 54 shown in the form of a unijunction transistor having an emitter electrode 57, a base electrode 56 and a base electrode 55 is shown having a base electrode 55 connected to a gate electrode 38 on current controlling device 35 and to conductor 39 through resistor 58. Base electrode 56 is connected to conductor 17 through conductors 46 and 44. Emitter electrode 57 is shown connected to conductor 17 through resistor 52, conductor 51, resistors 49 and 50, connected to stationary switch contacts 47 and 48 respectively, movable switch contact 45 and conductor 44. Conductor 51 is also shown connected to conductor 39 through capacitor 53.

The following is a table of values of the several components used in the above described embodiment.

Reference
character:   Value or type

18 _____ 5 ohm resistor.
19 _____ 22K ohm resistor.
25 _____ 47 ohm resistor.
26 _____ 25 mfd. capacitor.
59 _____ 4700 resistor.
28 _____ Type C-22 silicon controlled rectifier.
40 _____ 5,000 mfd. capacitor.
35 _____ Type C-22 silicon controlled rectifier.
21 _____ Type 2N2646 unijunction transistor.
54 _____ Type 2N2646 unijunction transistor.
52 _____ 3.3 ohm resistor.
53 _____ 250 mfd. capacitor.
58 _____ 47 ohm resistor.
49 _____ 4700 ohm resistor.
50 _____ 8200 ohm resistor.
41 _____ 100 K ohm resistor.

*Operation*

The operation will be started with the initial energization of terminals 13 and 14. As a source of DC current is applied to terminals 13 and 14 in the polarities shown, current controlling devices 28 and 35 remain nonconductive and capacitors 26, 40 and 53 are assumed to be in a state of discharge. The energization of terminals 13 and 14 results in a potential difference of the polarity shown across current controlling device 28. Current controlling device 28, being of the type that will remain nonconductive until suitably triggered or gated to a conductive state, remains nonconductive and the potential applied theiracross results in a gradual charging of capacitor 26 through resistor 19. When the potential at the left end of capacitor 26 reaches the firing potential required to render potiential responsive device 21 conductive, a current is applied to gate electrode 31 on current controlling device 28 which is then rendered conductive to complete a charging circuit for capacitor 40 from terminal 13 through fuse 15, asymmetrical current conducting device 16, conductor 17, resistor 18, conductor 20, anode electrode 30, cathode electrode 29, conductor 27, capacitor 40, and conductor 39 connected to terminal 14. Current controlling device 28 will remain conductive until the capacitor 40 becomes fully charged and, at this point, it will be noted that there is no potential difference across anode and cathode electrodes 30 and 29 on current controlling device 28. This is also true of potential responsive current controlling device 21 and both devices will thereby be rendered nonconductive.

During at least a portion of the above described charging capacitor 40, capacitor 53 is also gradually charging through either resistor 49 or 50 depending upon the frequency of operation desired for the fence controlling apparatus. As capacitor 53 acquires a charge of electrical energy, the potential at conductor 51 will gradually increase at a point at which potential responsive current controlling device 54 will be rendered conductive. At this time, which is substantially later than the charging of capacitor 40 and the accompanying rendering of current controlling device 28 and potential responsive current controlling device 21 nonconductive, current controlling device 35 will be rendered conductive by the application of a current to its gate electrode 38.

At the time that current controlling device 35 is rendered conductive, it is operative to complete a circuit from the top of capacitor 40 through conductor 27, transformer primary winding 33, anode electrode 37, cathode electrode 36 and conductor 39 connected to the lower end of capacitor 40. Capacitor 40 will immediately discharge through transformer primary winding 33 and current controlling device 35. At such time as the potential on capacitor 40 decreases to a predetermined value, current controlling device 35 will be rendered nonconductive and the full potential of the source of electric current connected to terminals 13 and 14 will again appear across current controlling device 28.

Following a short time delay effected by resistor 19 and capacitor 26, potential responsive current controlling device 21 will again be rendered conductive to in turn render current controlling device 28 conductive to continue with another cycle of operation.

Each time transformer primary winding 33 is energized, an output pulse of substantially constant magnitude will appear across secondary winding 34 and this is normally sufficient to energize gaseous discharge device 42 to indicate that the fence controller is in operation and the output of transformer secondary winding 34 is applied to fence conductor 10 and to ground whereby livestock, or other objects, that are in contact with the ground will receive the application of an electric pulse upon engagement with fence conductor 10.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In apparatus of the class above described in which an electrically conductive fence enclosure is to be periodically energized with pulses of electrical energy, direct current fence controller apparatus comprising in combination:
   (a) a pair of input terminals adapted for connection to a source of direct current potential;
   (b) a first current controlling means and energy storage means connected in series intermediate said input terminals;
   (c) a second current controlling device and load means connected in parallel with said energy storage means;
   (d) a first potential responsive triggering means connected in parallel with said first current controlling device, said triggering means having an output terminal connected to an input terminal on said first current controlling device; and
   (e) a second potential responsive triggering means having a pair of input electrodes connected to said input terminals independently of said first potential responsive triggering means and an output terminal connected to an input terminal on said second current controlling device.

2. The apparatus of claim 1 in which the potential responsive current controlling devices exhibit the characteristics of unijunction transistors.

3. The apparatus of claim 1 in which the current controlling devices exhibit the characteristics of silicon controlled rectifiers.

4. The apparatus of claim 1 in which the energy storage means exhibit capacitive characteristics.

5. The apparatus of claim 4 in which first and second time delay means are associated with the first and second potential responsive devices respectively.

6. The apparatus of claim 5 in which the time delay of the first time delay means is substantially less than the time delay of the second time delay means.

7. The apparatus of claim 6 in which the first and second time delay means exhibit capacitive characteristics.

8. A direct current fence controller comprising in combination:
   (a) a pair of input terminals;
   (b) output means;
   (c) first current controlling means having input and output terminals;
   (d) potential responsive current controlling means;
   (e) circuit means connecting said potential responsive current controlling means and a capacitor means in series with said input terminals;
   (f) circuit means connecting said output means and the output terminals on said first current controlling means in series across said capacitor means; and
   (g) means operable independently of said potential responsive current controlling means, for rendering said first current controlling means conductive a predetermined time interval after said capacitor means has been charged to a predetermined energy level.

9. The apparatus of claim 8 in which the means for rendering the first current controlling means conductive includes potential responsive time delay means connected to the input terminals thereof.

10. The apparatus of claim 9 in which the current controlling means exhibit the characteristics of silicon controlled rectifiers.

References Cited

UNITED STATES PATENTS

| | | | |
|---|---|---|---|
| 2,415,944 | 2/1947 | Fagen | 307—108 |
| 3,047,789 | 7/1962 | Lowry | 321—18 |
| 3,119,058 | 1/1964 | Genuit | 321—45 |
| 3,263,099 | 7/1966 | Bedford | 320—1 |

OTHER REFERENCES

GE SCR Manual, 1961, pp. 135–137, 2nd edition.

MILTON O. HIRSHFIELD, *Primary Examiner.*

D. F. DUGGAN, *Assistant Examiner.*